Patented Dec. 27, 1927.

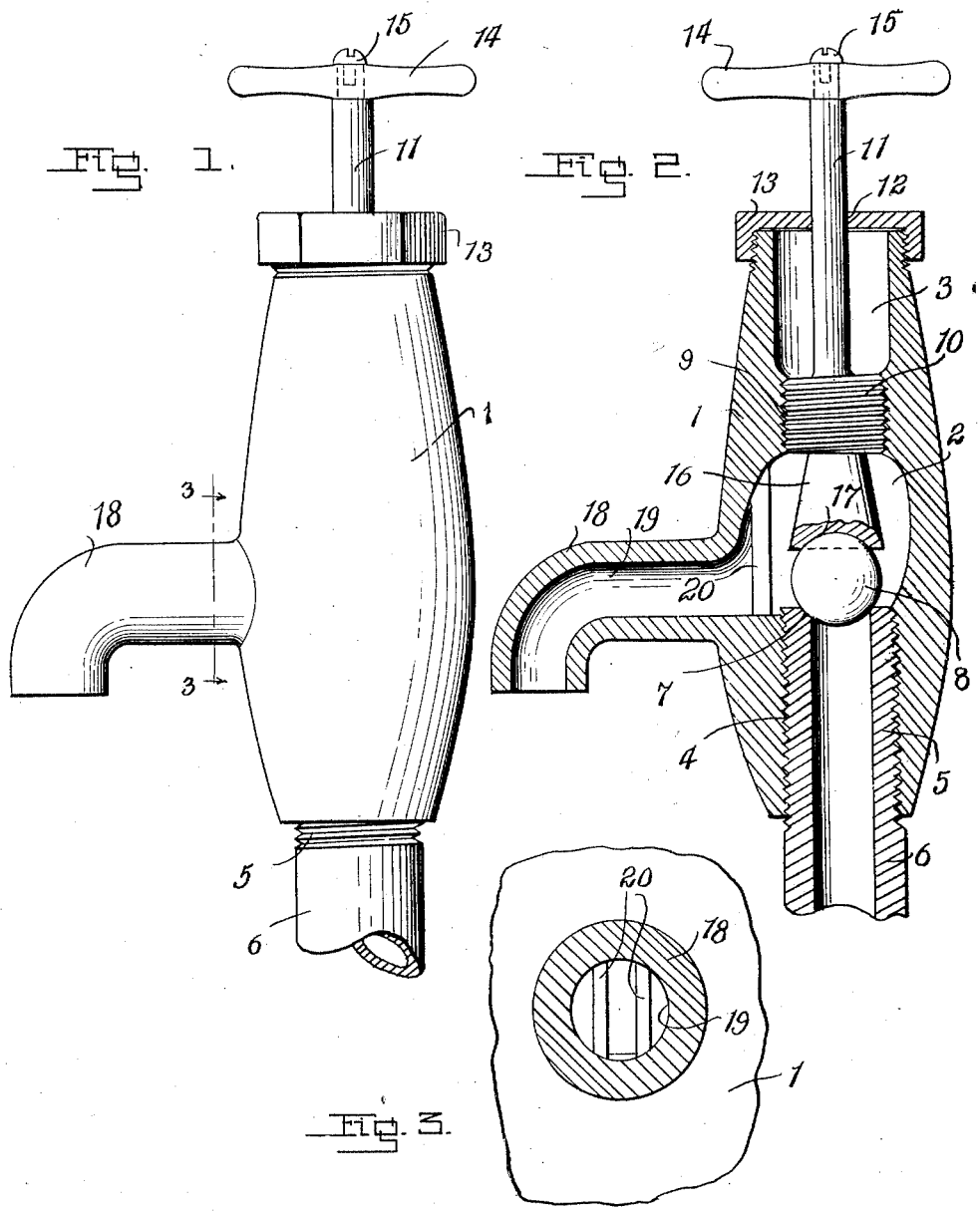

1,654,237

UNITED STATES PATENT OFFICE.

WILLIAM H. BROOKER, OF BISMARCK, NORTH DAKOTA.

FAUCET.

Application filed December 30, 1926. Serial No. 158,070.

This invention relates to faucets and one object of the invention is to provide a faucet consisting of a comparatively few number of parts and through which liquid may readily flow when the faucet is open but very effectively cut off when the faucet is closed.

Another object of the invention is to permit the nipple which connects the faucet with a supply pipe to constitute a valve seat against which a valve ball is firmly held when the faucet is closed.

Another object of the invention is to provide the faucet with an improved type of valve stem and head for engaging the valve ball and holding the ball in firm sealing engagement with its seat.

Another object of the invention is to provide a faucet in which the nipple projecting from its inlet end is axially alined with the valve stem and the outlet nozzle projects from a side portion of its body thereby producing a faucet having a compact construction.

The invention is illustrated in the accompanying drawing, wherein

Figure 1 is a view showing the improved faucet in side elevation;

Fig. 2 is a longitudinal sectional view through the faucet, and

Fig. 3 is a transverse sectional view taken through the outlet nozzle on the line 3—3 of Fig. 1.

The body portion 1 of the improved faucet is formed of metal and is of an elongated construction, as shown in Figs. 1 and 2. The body is formed with a longitudinally extending bore having its intermediate portion enlarged to provide a chamber 2 and upper and lower passages 3 and 4 leading therefrom through the ends of the body. The lower passage 4 is threaded throughout its length in order to receive the threaded end portion 5 of a nipple 6 which may have its other end portion adapted to be connected with a supply pipe or, if so desired, may constitute a section of a supply pipe. The inner end of the nipple 6 is shaped to define a concaved valve seat 7 upon which the valve ball 8 rests when the faucet is closed. The passage 3 which opens through the upper end of the body has its inner end portion reduced in diameter and threaded, as shown at 9, for engagement with the threads of a collar 10 formed upon a valve stem 11 which projects outwardly through an opening 12 formed in a cap 13 screwed upon or into the upper end of the body. At its outer end the stem carries a turning handle 14 which is of a conventional construction and releasably secured by a securing screw 15 so that the handle may be removed if it is desired to disconnect the cap from the stem for any reason. At its inner end the stem is enlarged to form a head 16 which extends into the chamber 2. The head increases in diameter toward its free end and at its free end is formed with a concaved recess 17 adapted to receive a portion of the valve ball and prevent the ball from slipping out of engagement with the seat 7 when the stem is rotated in a closing or tightening direction. The outlet spout or nozzle 18 of the faucet projects from a side portion thereof and is formed with a bore 19 communicating with the chamber 2. Rods 20 extend vertically in the chamber adjacent and in crossed relation to the inner end of the bore 19 so that, when the stem is rotated to lift the head 16 and release the ball 8, the pressure of the water passing through the faucet will not be able to cause the valve ball to move into closing relation to the inner end of the bore 19 or pass through the nozzle if the bore thereof is of greater diameter than the valve ball. Since the inlet is disposed directly beneath the valve stem, the pressure of the water will tend to move the valve ball upwardly and hold it in engagement with the lower or inner end of the head 16 and, therefore, when the stem is rotated in a closing direction the valve ball will be very easily moved into proper seating engagement with the valve seat and concaved face of the head and a very tight closure provided.

Having thus described the invention, I claim:

1. A faucet comprising a body having a longitudinally extending bore enlarged intermediate its length to form a chamber having upper and lower passages leading therefrom through the ends of the body, the lower passage having threaded walls, a nozzle projecting from a side portion of said body and having a bore communicating with said chamber, a nipple removably secured in the lower passage and having its inner end shaped to define a valve seat, a valve ball in said chamber to seat against the inner end of said nipple and of less diameter than the lower passage, the upper passage having its walls threaded for a portion of its length, a cap for the upper end of the upper passage formed with a central opening and removably engaged with said body, and a stem extending through the opening of said cap into said upper passage and having a threaded collar engaged with the threads thereof and at its inner end having a head extending into said chamber, the free end of said head being recessed to receive a portion of the valve ball and hold the valve ball in sealing engagement with the valve seat at the inner end of the nipple when the stem is rotated and moved inwardly.

2. A faucet comprising a body having a longitudinally extending bore enlarged intermediate its length to form a chamber having passages leading therefrom through the upper and lower ends of the body, a nozzle projecting from a side portion of said body and having a bore communicating with said chamber, a nipple removably secured in the lower passage and having its inner end terminating substantially flush with the bottom of said chamber, a valve ball in said chamber, a cap for the upper end of the other passage, a valve stem extending through the cap and upper passage and having a head at its inner end extending into said chamber, said stem being longitudinally adjustable whereby its head may be moved into position to engage the ball and hold the ball against the inner end of the nipple in sealing relation thereto.

3. A faucet comprising a body having a chamber formed therein intermediate its length and passages leading from its upper and lower ends and communicating with the chamber, the lower passage being threaded throughout its length and the upper passage having its inner end portion reduced and threaded, a nipple screwed into the lower passage and having its inner end constituting a valve seat, a nozzle projecting from said body and having a bore communicating with said chamber through a side portion thereof, a valve ball in said chamber of less diameter than the lower passage, a cap for the outer end of the upper passage removably engaged with said body, a stem passed through said cap and extending axially through the upper passage and having a valve ball engaging head at its inner end extending into the chamber and adjacent the head having a threaded collar engaging the threaded portion of the upper passage, and a turning handle carried by said stem whereby the stem may be rotated to move its head into and out of position to engage the valve ball and retain the valve ball seated upon the valve seat.

In testimony whereof I affix my signature.

WILLIAM H. BROOKER. [L. S.]